(12) United States Patent
Sanders (10) Patent No.: US 9,242,622 B1
(45) Date of Patent: Jan. 26, 2016

(54) LANDING GEAR ELEVATOR

(71) Applicant: Donald Sanders, Warner Robins, GA (US)

(72) Inventor: Donald Sanders, Warner Robins, GA (US)

(*) Notice: Subject to any disclaimer, the term of this patent is extended or adjusted under 35 U.S.C. 154(b) by 1 day.

(21) Appl. No.: 14/177,320

(22) Filed: Feb. 11, 2014

(51) Int. Cl.
*B60S 9/08* (2006.01)

(52) U.S. Cl.
CPC .......................................... *B60S 9/08* (2013.01)

(58) Field of Classification Search
CPC ................ B60S 9/04; B60S 6/06; B60S 9/08; B66F 7/0608
USPC ........................................ 254/425; 280/763.1
See application file for complete search history.

(56) References Cited

U.S. PATENT DOCUMENTS

| | | | | |
|---|---|---|---|---|
| 4,097,840 A * | 6/1978 | Chappelle | ...................... | 340/431 |
| 4,345,779 A * | 8/1982 | Busby | ......................... | 280/766.1 |
| 4,466,637 A * | 8/1984 | Nelson | ........................ | 280/766.1 |
| 5,865,499 A * | 2/1999 | Keyser | .......................... | 296/173 |
| 5,897,121 A * | 4/1999 | Case | ............................. | 279/145 |
| 5,904,342 A * | 5/1999 | Laarman | ........................ | 254/419 |
| 5,911,437 A * | 6/1999 | Lawrence | .................. | 280/766.1 |
| 6,010,154 A * | 1/2000 | Payne et al. | ................ | 280/766.1 |
| 6,218,746 B1 * | 4/2001 | Gouge, Jr. | ....................... | 310/50 |
| 6,224,103 B1 * | 5/2001 | Hatcher | ..................... | 280/766.1 |
| 6,598,886 B2 * | 7/2003 | Baird et al. | ................. | 280/766.1 |
| 6,912,927 B2 * | 7/2005 | Eberle | ............................. | 74/425 |
| 6,926,305 B2 * | 8/2005 | Daniel | ........................ | 280/766.1 |
| 7,036,847 B2 | 5/2006 | Alguera et al. | | |
| 7,163,207 B2 * | 1/2007 | Baird et al. | ................. | 280/6.153 |
| 7,328,884 B2 * | 2/2008 | Garceau | ......................... | 254/126 |
| 7,429,061 B2 * | 9/2008 | Perkins | ..................... | 280/766.1 |
| 8,052,125 B2 * | 11/2011 | Garceau | ......................... | 254/418 |
| 8,590,417 B1 * | 11/2013 | Bono et al. | ..................... | 74/545 |
| 8,827,309 B1 * | 9/2014 | Ouellet | ........................ | 280/763.1 |
| 8,910,924 B2 * | 12/2014 | Alanko | ........................ | 254/420 |
| 2006/0043717 A1 * | 3/2006 | Baxter | ........................ | 280/763.1 |
| 2008/0149904 A1 * | 6/2008 | Garceau | ........................ | 254/103 |
| 2014/0077140 A1 * | 3/2014 | Baird | ............................ | 254/419 |

* cited by examiner

*Primary Examiner* — Lee D Wilson
*Assistant Examiner* — Jamal Daniel
(74) *Attorney, Agent, or Firm* — Kyle A. Fletcher, Esq.

(57) ABSTRACT

The landing gear elevator includes a motor that is configured to connect with a trailer landing gear rod in order to raise and lower the respective tractor-trailer. The motor includes a rechargeable powering member coupled thereto in order to remotely power the motor. The motor includes a plurality of handles to provide a variety of gripping locales when in use. The motor is coupled to a gear reducer in order to exchange rpm for torque needed to raise and lower the tractor-trailer landing gear. The gear reducer includes a drive shaft that connects with a drive coupling. The drive coupling is configured to attach and lock itself to the trailer landing gear rod. A power/speed control switch provides optional output of the motor and gear reducer.

16 Claims, 8 Drawing Sheets

LANDING GEAR ELEVATOR

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of landing gears of tractor-trailers, more specifically, a landing gear elevator that is automated, and configured to raise or lower the landing gear.

SUMMARY OF THE INVENTION

An embodiment of the disclosure meets the needs presented above by generally comprising a motor that is configured to connect with a trailer landing gear rod in order to raise and lower the respective tractor-trailer. The motor includes a rechargeable powering member coupled thereto in order to remotely power the motor. The motor includes a plurality of handles to provide a variety of gripping locales when in use. The motor is coupled to a gear reducer in order to exchange rpm for torque needed to raise and lower the tractor-trailer landing a drive coupling. The drive coupling is configured to attach and lock itself to the trailer landing gear rod. A power/speed control switch provides optional output of the motor and gear reducer.

An object of the invention is to provide a

These together with additional objects, features and advantages of the landing gear elevator will be readily apparent to those of ordinary skill in the art upon reading the following detailed description of presently preferred, but nonetheless illustrative, embodiments of the landing gear elevator when taken in conjunction with the accompanying drawings.

In this respect, before explaining the current embodiments of the landing gear elevator in detail, it is to be understood that the landing gear elevator is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the landing gear elevator.

It is therefore important that the claims be regarded as including such equivalent construction insofar as they do not depart from the spirit and scope of the landing gear elevator. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

As best illustrated in FIGS. 1 through 7, the landing gear elevator 100 (hereinafter invention) is further comprised of a motor 101 that is configured to connect to a trailer landing gear rod 200 in order to raise and lower a respective tractor-trailer landing gear leg 201. It shall be noted that in the prior art, a tractor-trailer typically includes a pair of the tractor-trailer landing gear legs 201. Moreover, the landing gear legs move up and down in concert upon rotation, either clockwise or counterclockwise, of the trailer landing gear rod 201. The invention 100 is configured to rotate the trailer landing gear rod 201 in order to raise or lower the tractor-trailer landing gear legs 201.

The motor 101 includes a rechargeable powering member 102 that is secured underneath the motor 101, and provides electrical power to the invention 100. Moreover, the motor 101 includes a set of band members 103 that encircle the motor 101 and extend downwardly to support the rechargeable powering member 102 underneath the motor 101.

The motor 101 includes a top handle 104 that extends upwardly from the motor 101 in order to provide a handle with which to grasp the invention 100 from directly above the motor 101. The top handle 104 is a "U"-shaped component that is rigidly affixed to the sides of the motor 101 via a fastening member 105 comprising a bolt, screw, nail, rivet, etc.

Figure 1:
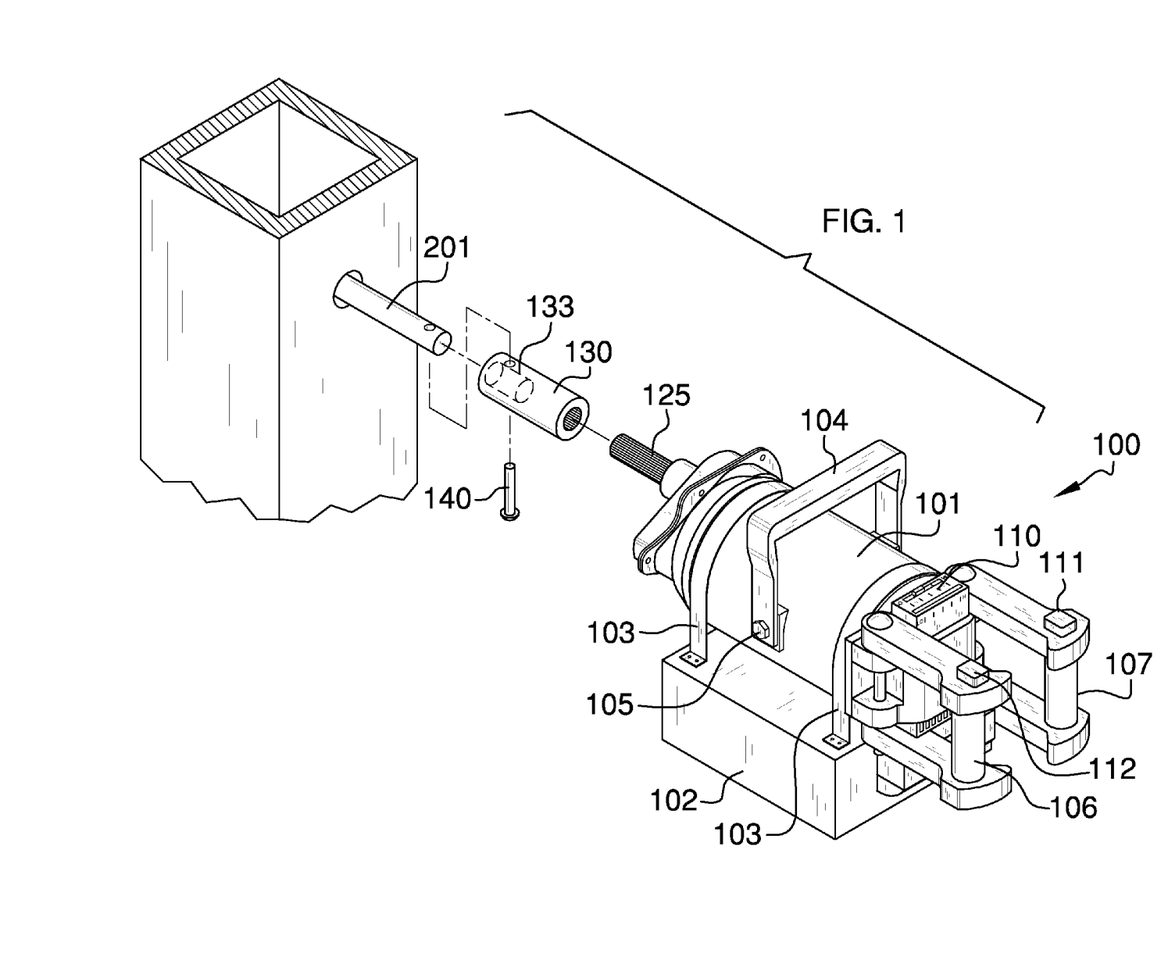
FIG. 1 is an exploded view of the landing gear elevator with respect to the landing gear leg and the drive-coupling member.
Figure 2:
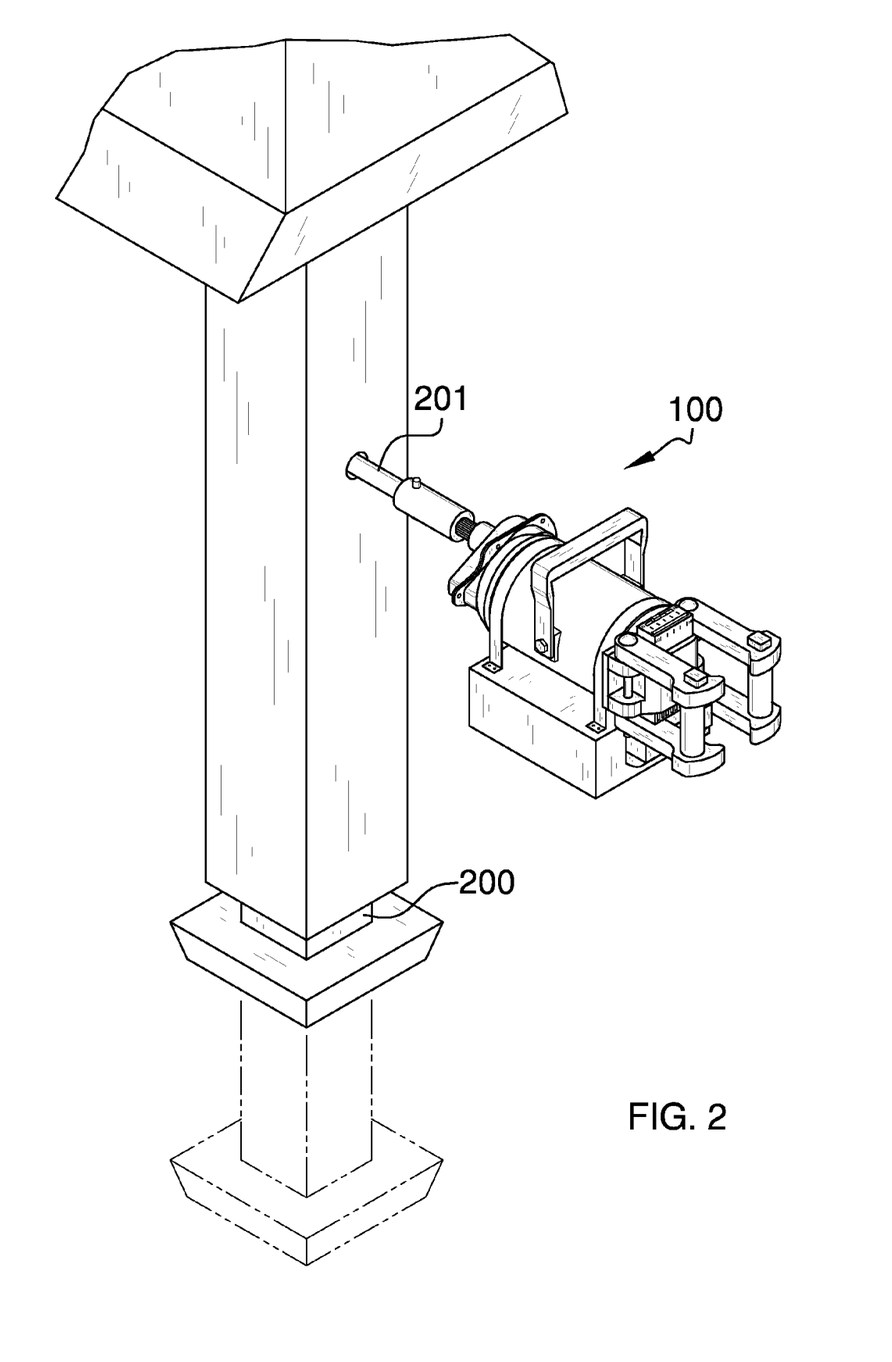
FIG. 2 is a perspective view of the landing gear elevator connected to the landing gear leg.
Figure 3:
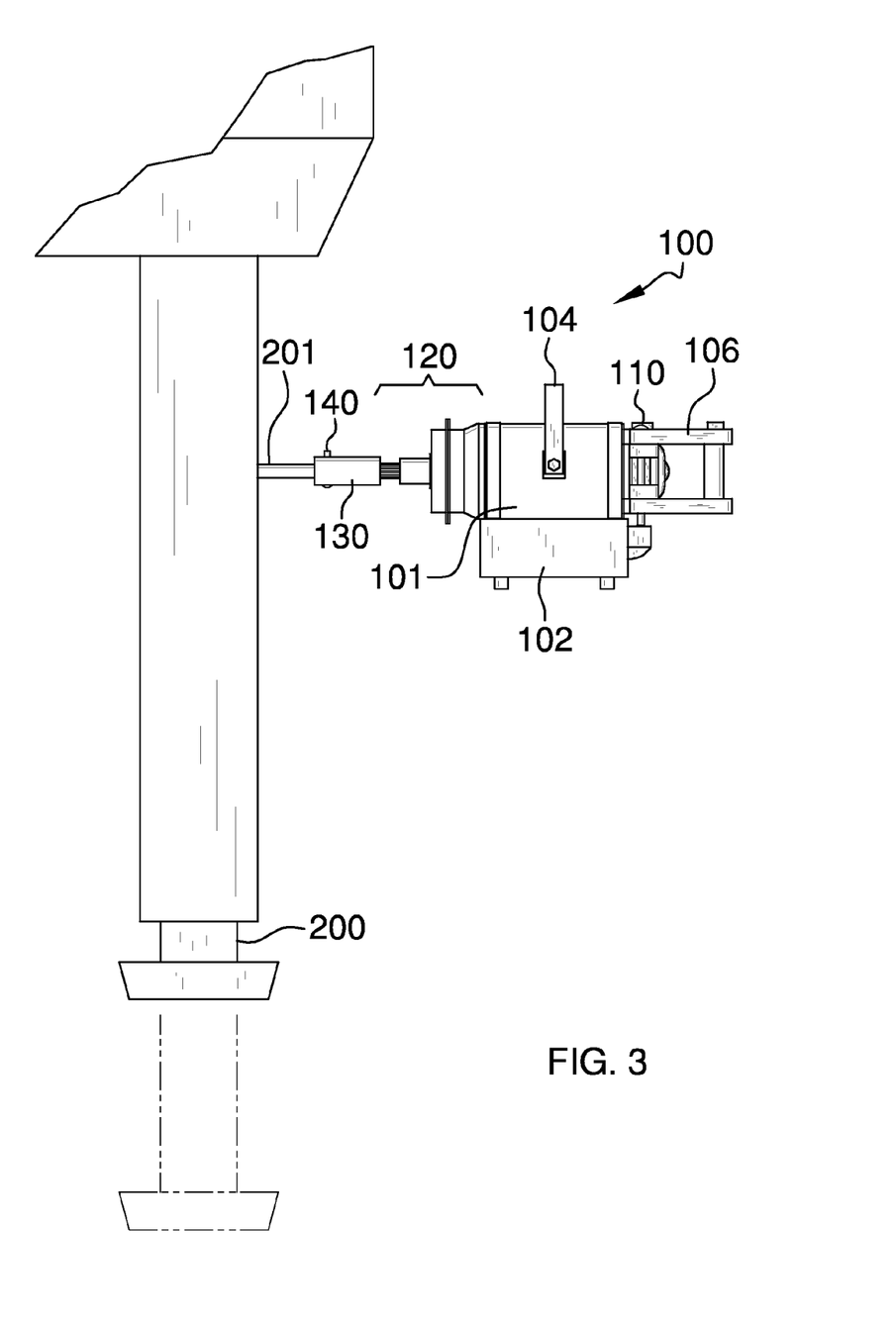
FIG. 3 is a side view of the landing gear elevator connected to the landing gear leg.
Figure 4:
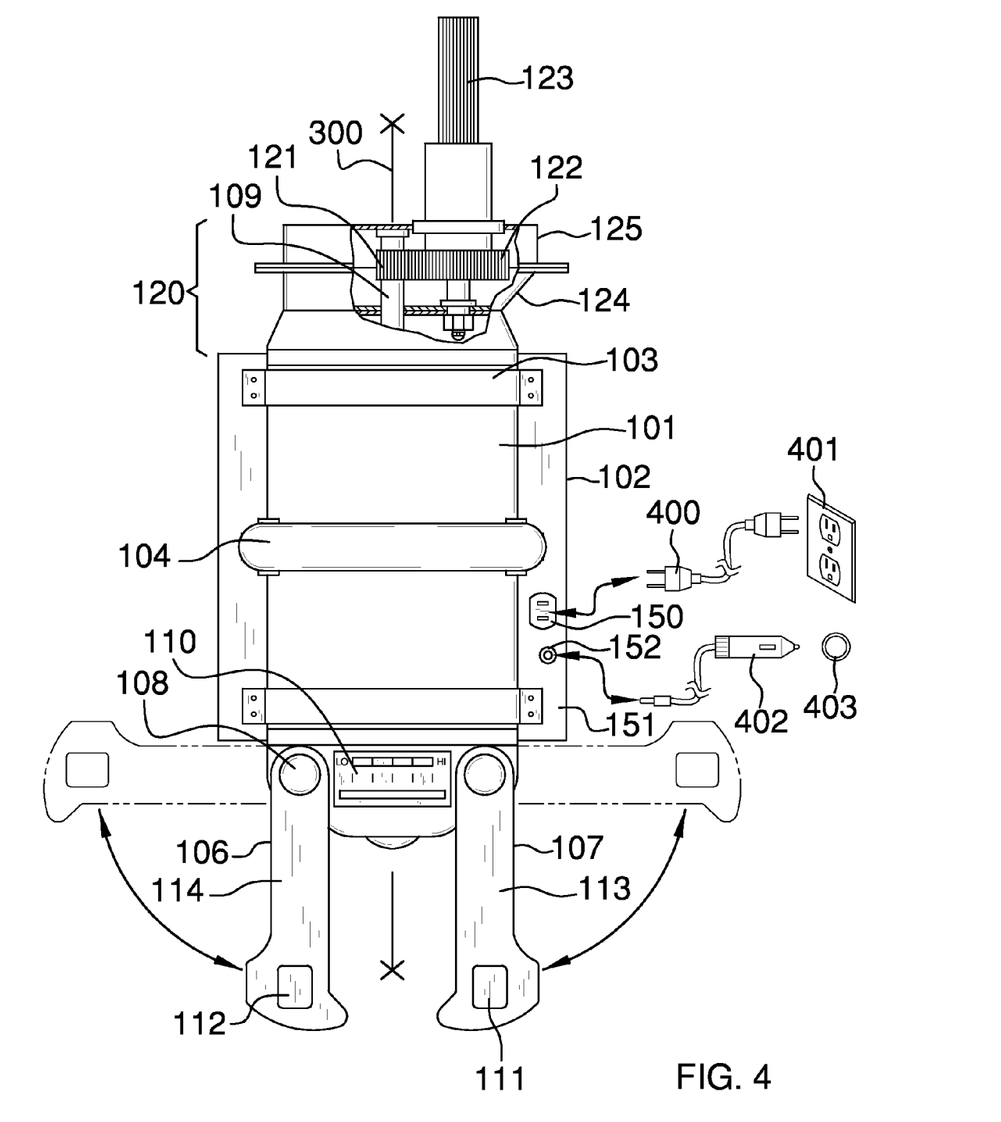
FIG. 4 is a top view of with a partial cut-away detailing componentry associated with the landing gear elevator.
Figure 5:
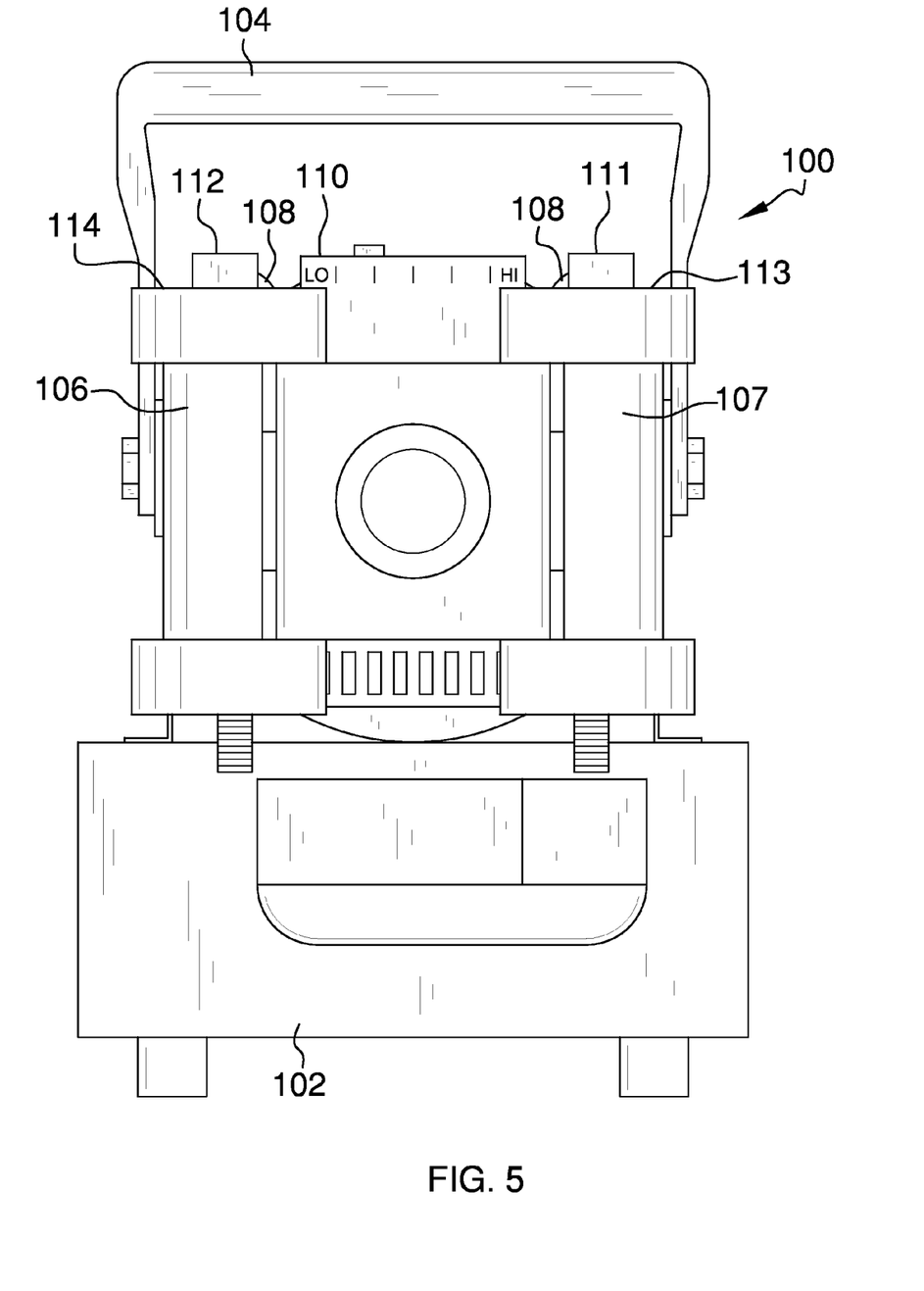
FIG. 5 is a rear view of the landing gear elevator.
Figure 6:
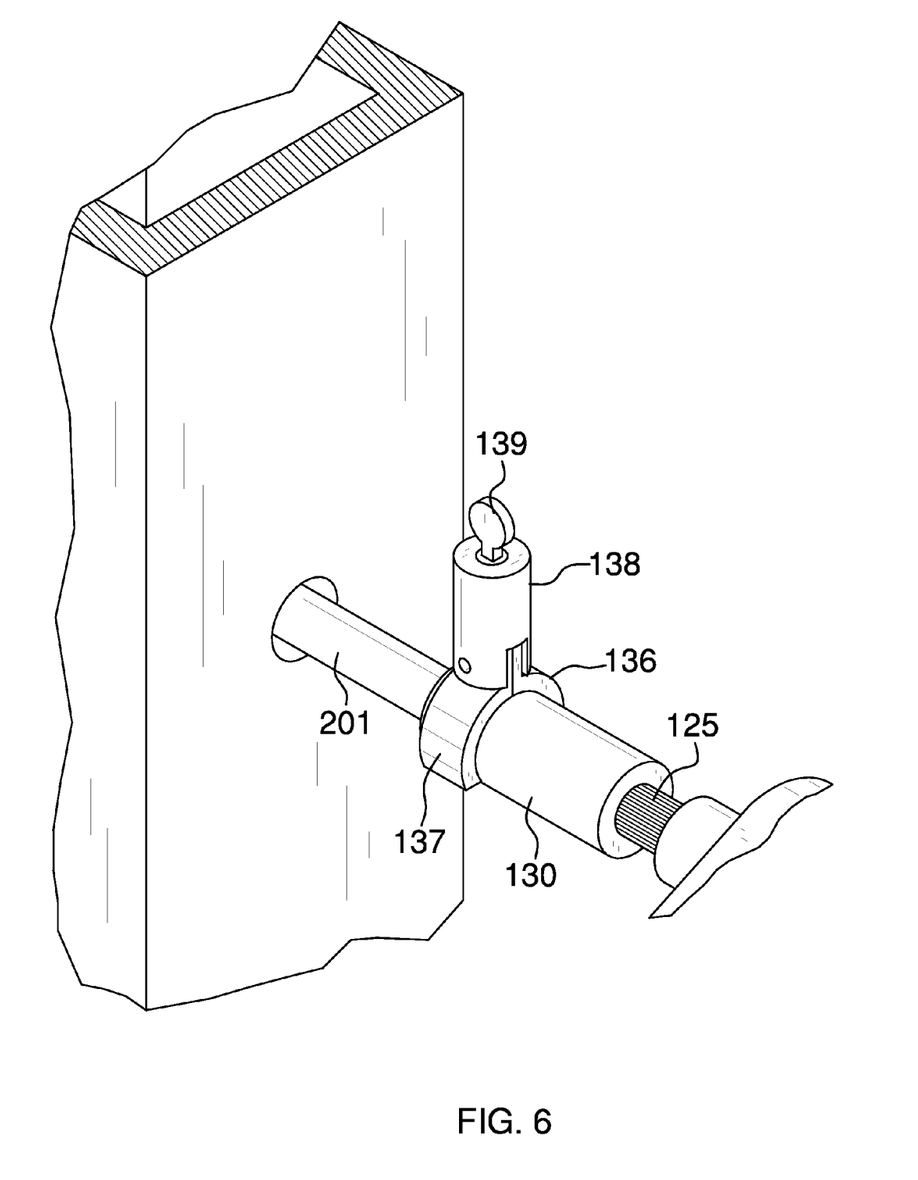
FIG. 6 is a detailed view of the drive-coupling.

Referring to FIG. 4, the invention 100 includes a left handle 106 and a right handle 107. Both the left handle 106 and the right handle 107 are positioned to a rear portion of the invention 100, and are able to pivot about a pin 108. Both the left handle 106 and the right handle 107 are each able to pivot from a perpendicular orientation to a parallel orientation with a main motor shaft axis 300. The main motor shaft axis 300 is concentrically aligned with a main motor shaft 109 that is positioned on an opposing end of the motor 101 with respect to the left handle 106 and the right handle 107.

Positioned in between the pins 108 of the left handle 106 and the right handle 107 is a power/speed control switch 110. The power/speed control switch 110 is responsible for adjusting the output of RPMS of the main motor shaft 109. The power speed control switch 110 is in wired communication with the motor 101 as well as with the rechargeable powering member 102. Moreover, the power speed control switch 110 is in wired communication with an on/off/down push button 111 that is located on the right handle 107. The power speed control switch 110 is in wired communication with an on/off/up push button 112 that is located on the left handle 106. It shall be noted that the on/off/down push button 111 is located on a top right handle surface 113 of the right handle 107 such that the on/off/down push button 111 is out of the way of the right handle 107 when in use. It shall also be noted that the on/off/up push button 112 is located on a top left handle surface 114 of the right handle 106 such that the on/off/up push button 112 is out of the way of the left handle 106 when in use.

Output of the main motor shaft 109 is dictated upon depression of either the on/off/down push button 111 or the on/off/up push button 112. The main motor shaft 109 is in mechanical connection with a gear reducer 120. The gear reducer 120 simply reduces the RPM out of the main motor shaft 109 in exchange for a greater amount of torque. Referring to FIG. 4, the main motor shaft 109 includes a first gear 121; whereas the gear reducer 120 includes a second gear 122. The second gear 122 is greater in size than the first gear 121. Moreover, the second gear 122 is coupled to a gear reducer drive shaft 123. The gear reducer 120 includes a first gear reducer cover 124 and a second gear reducer cover 125, which provide protection of the inner workings of the gear reducer 120 from environmental conditions.

Figure 7:
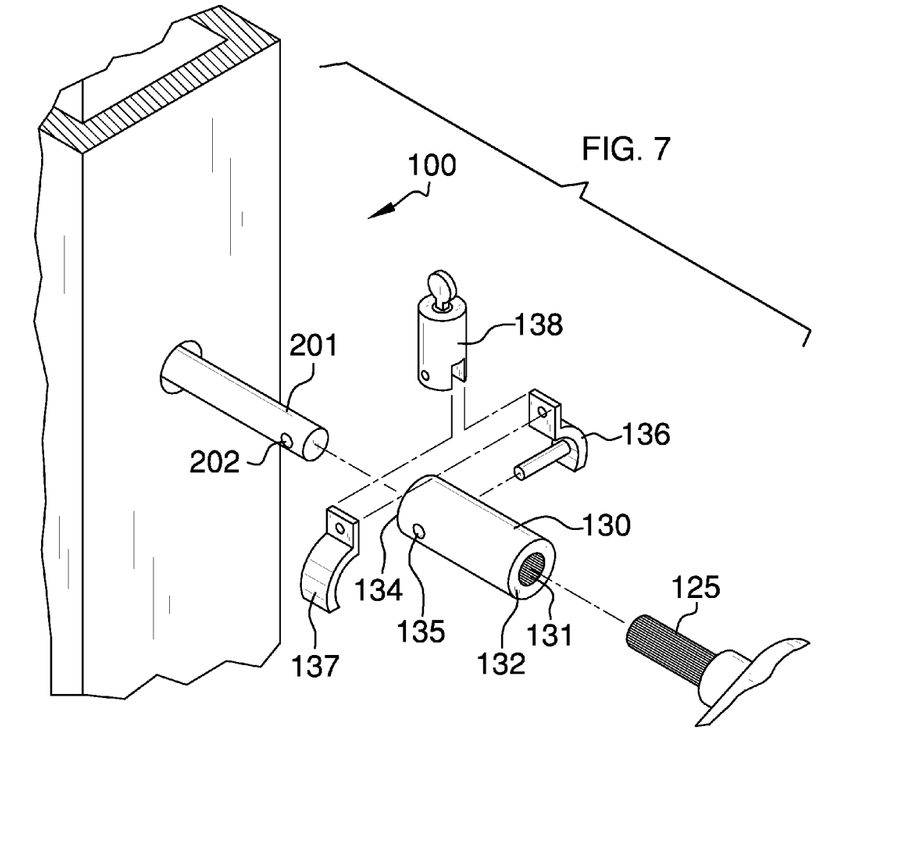
FIG. 7 is an exploded view of the drive-coupling.

The gear reducer drive shaft 123 connects with a drive-coupling member 130. The drive-coupling member 130 is configured to attach to the landing gear rod 201. Moreover, the drive-coupling member 130 includes a gear reducer receiver 131 on a first distal end 132 and a landing gear receiver 133 at a second distal end 134. The landing gear receiver 133 includes a square-shape that is configured to receive the landing gear rod 201. Moreover, the drive-coupling member 130 includes a set of lock holes 135 that enable a first clamp member 136 to extend across both the drive coupling member 130 as well as the landing gear rod 201. The landing gear rod 201 includes a landing lock hole 202. The first clamp member 136 connects with a second clamp member 137 in order for a locking member 138 to lock both the first clamp member 136 and the second clamp member 137 in place with respect to the drive-coupling member 130. Moreover, a key 139 is included in order to lock and unlock the locking member 138/Referring to FIG. 1, it shall be noted that a pin member 140 may be used to secure the drive-coupling member 130 to the landing gear rod 201 in lieu of the first clamp member 136 and second clamp member 137 and locking member 138 as depicted in FIG. 7.

The rechargeable powering member 102 is unique to the invention 100 in that the band members 103 may be removed as needed in order to replace the rechargeable powering member 102. Moreover, the rechargeable powering member 102 is essentially a large rechargeable battery that includes an electrical plug receptacle 150 on a first surface 151. The electrical plug receptacle 150 enables an electrical plug 400 to connect and provide electricity from a standard wall outlet 401 in order to recharge the rechargeable powering member 102. Moreover, the rechargeable powering member 102 includes an adaptor plug receptacle 152 that enables a cigarette lighter power cord 402 to deliver electricity to the rechargeable powering member 102 via a cigarette plug 403 that is typical of a vehicle.

Figure 8:
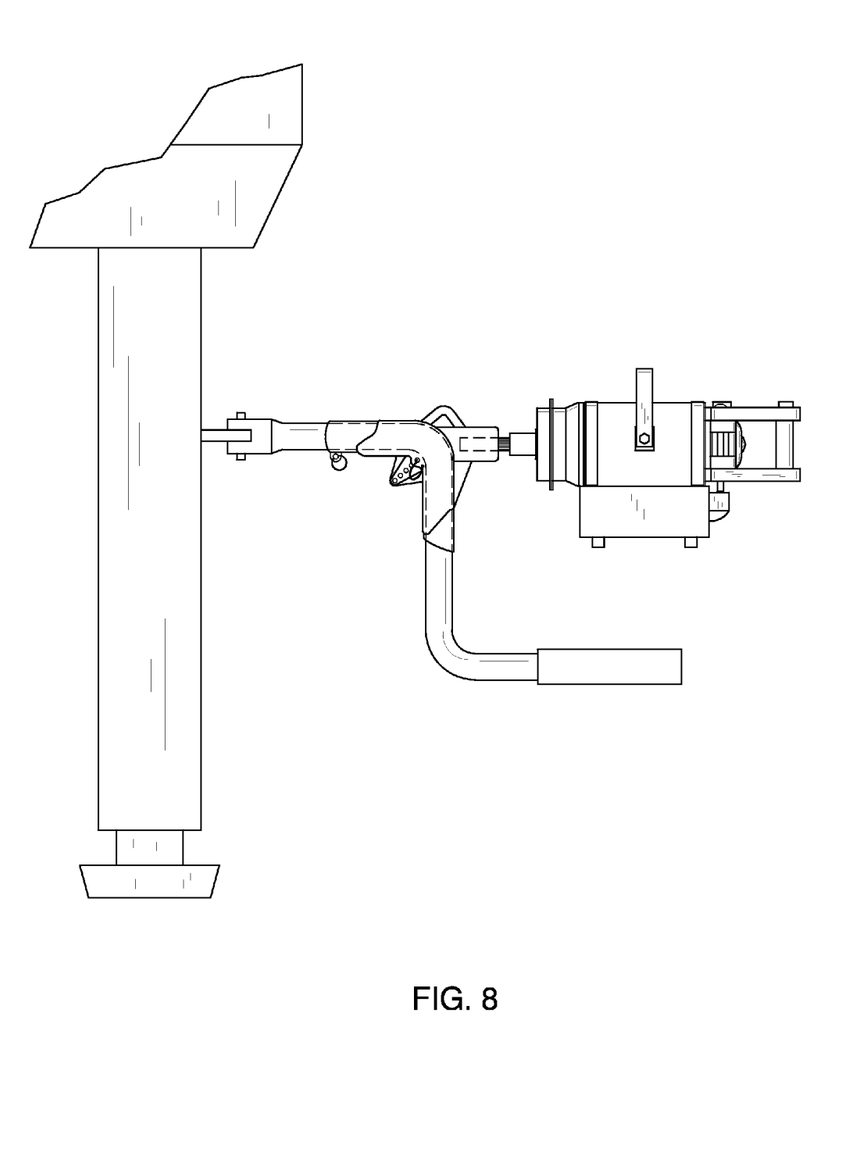
FIG. 8 is a side view of the landing gear elevator and handle coupling attached to a landing gear handle.

Referring to FIG. 8, the invention 100 may utilize a handle coupling 500 that is configured to attach to a landing gear handle 501 of a landing gear 200. The landing gear handle 501 is commonly seen on tractor-trailers, and is manually rotated in order to raise or lower the landing gear 200. The handle coupling 500 contours to attach itself at a first elbow 502 of the landing gear handle 501. The handle coupling 500 includes a handle coupling gear reducer receiver 503 that is concentrically aligned with a first armature span 504 of the landing gear handle 501. Moreover, the handle coupling gear reducer receiver is able to connect with the gear reducer drive shaft 123, and which enables the invention 100 is able to rotate the landing gear handle 501 as opposed to manual rotation.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A landing gear elevator comprising:
    a motor with a gear reducer configured to attach to a landing gear rod of a tractor-trailer;
    wherein said motor is able to rotate the gear reducer clockwise or counterclockwise in order to raise or lower a pair of tractor-trailer landing gear legs;
    wherein the motor includes a rechargeable powering member that is secured underneath the motor, and provides electrical power to the motor; wherein the motor includes a set of band members that encircle the motor and extend downwardly to support the rechargeable powering member underneath the motor;
    wherein the motor includes a top handle that extends upwardly from the motor in order to provide a handle with which to grasp the landing gear elevator from directly above the motor;
    wherein a left handle and a right handle are positioned to a rear portion of the motor; wherein the left handle and the right handle are each able to pivot independently of one another, and with respect to the rear portion of the motor via a pin.

2. The landing gear elevator according to claim 1 wherein the top handle is a "U"-shaped component that is rigidly affixed to the sides of the motor via a fastening member comprising a bolt, screw, nail, rivet.

3. The landing gear elevator according to claim 1 wherein both the left handle and the right handle are each able to pivot from a perpendicular orientation to a parallel orientation with a main motor shaft axis; wherein the main motor shaft axis is concentrically aligned with a main motor shaft that is positioned on an opposing end of the motor with respect to the left handle and the right handle.

4. The landing gear elevator according to claim 3 wherein a power/speed control switch is positioned in between the left handle and the right handle; wherein the power/speed control switch is responsible for adjusting the output of RPMS of the main motor shaft of the motor.

5. The landing gear elevator according to claim 4 wherein the power speed control switch is in wired communication with the motor as well as with the rechargeable powering member.

6. The landing gear elevator according to claim 5 wherein the power speed control switch is in wired communication with an on/off/down push button and an on/off/up push button.

7. The landing gear elevator according to claim 6 wherein the on/off/down push button is located on either the left handle or the right handle whereas the on/off/up push button is located on the opposing right handle or left handle.

8. The landing gear elevator according to claim 7 wherein the left handle includes a top left handle surface; wherein the right handle includes a top right handle surface; wherein the on/off/down push button and the on/off/up push button are located on either the top left handle surface or the top right handle surface.

9. The landing gear elevator according to claim 7 wherein the main motor shaft is dictated upon depression of either the on/off/down push button or the on/off/up push button; wherein the main motor shaft is in mechanical connection with the gear reducer; wherein the main motor shaft includes a first gear, whereas the gear reducer includes a second gear; wherein the second gear is greater in size than the first gear; wherein the second gear is coupled to a gear reducer drive shaft; wherein the gear reducer includes a first gear reducer cover and a second gear reducer cover, which provide protection of the inner workings of the gear reducer from environmental conditions.

10. The landing gear elevator according to claim 9 wherein the gear reducer drive shaft connects with a drive-coupling member; wherein the drive-coupling member is configured to attach to the landing gear rod; wherein the drive-coupling member includes a gear reducer receiver on a first distal end and a landing gear receiver at a second distal end.

11. The landing gear elevator according to claim 10 wherein the drive-coupling member includes a set of lock holes that enable a first clamp member to extend across both the drive coupling member as well as the landing gear rod; wherein the landing gear rod includes a landing lock hole; wherein the first clamp member connects with a second clamp member in order for a locking member to lock both the first clamp member and the second clamp member in place with respect to the drive-coupling member; wherein a key is included in order to lock and unlock the locking member.

12. The landing gear elevator according to claim 10 wherein a pin member is used to secure the drive-coupling member to the landing gear rod.

13. The landing gear elevator according to claim 10 wherein the rechargeable powering member includes an electrical plug receptacle on a first surface; wherein an electrical plug connects to the electrical plug receptacle, and provides electricity from a standard wall outlet in order to recharge the rechargeable powering member.

14. The landing gear elevator according to claim 10 wherein the rechargeable powering member includes an adaptor plug receptacle that enables a cigarette lighter power cord to deliver electricity to the rechargeable powering member via a vehicular cigarette lighter.

15. The landing gear elevator according to claim 10 wherein a handle coupling is configured to attach to a landing gear handle of said landing gear; wherein the handle coupling contours to attach itself at a first elbow of the landing gear handle; wherein the handle coupling includes a handle coupling gear reducer receiver that is concentrically aligned with a first armature span of the landing gear handle.

16. The landing gear elevator according to claim 15 wherein the handle coupling gear reducer receiver is able to connect with the gear reducer drive shaft.

\* \* \* \* \*